United States Patent

Yang

(10) Patent No.: US 6,677,071 B2
(45) Date of Patent: Jan. 13, 2004

(54) BIPOLAR PLATE FOR A FUEL CELL

(75) Inventor: Jefferson YS Yang, Orange, CA (US)

(73) Assignee: Asia Pacific Fuel Cell Technologies, Ltd., Taipei (TW)

( * ) Notice: Subject to any disclaimer, the term of this patent is extended or adjusted under 35 U.S.C. 154(b) by 141 days.

(21) Appl. No.: 09/938,684

(22) Filed: Aug. 24, 2001

(65) Prior Publication Data

US 2002/0110718 A1 Aug. 15, 2002

(30) Foreign Application Priority Data

Feb. 15, 2001 (TW) ........................................ 90103433 A

(51) Int. Cl.$^7$ ................................................ H01M 8/04
(52) U.S. Cl. ........................................ 429/34; 429/39
(58) Field of Search .............................. 429/38, 39, 34

(56) References Cited

U.S. PATENT DOCUMENTS

| | | | | |
|---|---|---|---|---|
| 4,604,332 A | * | 8/1986 | Warszawski | 429/38 |
| 5,227,256 A | * | 7/1993 | Marianowski | 429/16 |
| 5,514,487 A | * | 5/1996 | Washington | 429/39 |
| 6,040,076 A | * | 3/2000 | Reeder | 429/35 |
| 6,322,919 B1 | * | 11/2001 | Yang | 429/34 |
| 6,503,653 B2 | * | 1/2003 | Rock | 429/35 |

FOREIGN PATENT DOCUMENTS

| | | | | |
|---|---|---|---|---|
| DE | 19910487 | * | 6/2000 | ............ H01M/8/02 |
| DE | 10019094 | * | 10/2001 | ............ H01M/8/02 |
| GB | 2359186 | * | 8/2001 | ............ H01M/8/10 |
| JP | 06-236765 | | 8/1994 | |
| JP | 10-308227 | | 11/1998 | |
| WO | WO 00215311 | * | 2/2002 | ............ H01M/8/02 |

* cited by examiner

*Primary Examiner*—Mark Ruthkosky
(74) *Attorney, Agent, or Firm*—Rosenberg, Klein & Lee

(57) ABSTRACT

This invention is related to a bipolar plate for a fuel cell, the bipolar plate comprises a central area and a surrounding area, wherein the central area has a first side surface and a second side surface opposed to the first side surface, the central area is in a form of continuous corrugation which defines a plurality of grooves that are substantially parallel with and complementary to each other on each of the first side surface and the second side surface. The thickness of the bipolar plate of this invention can be very thin so as to decrease the dimension and weight of the fuel cell. The grooves are connected to enlongated holes in the surrounding area by channels which are formed in a longitudinal direction on a first side and in a direction transverse to a longitudinal direction on a second side. The cost for manufacturing the fuel cell is also reduced by the simplified process of this invention.

6 Claims, 7 Drawing Sheets

BIPOLAR PLATE FOR A FUEL CELL

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to a bipolar plate for a fuel cell, in particular, a corrugated bipolar plate made of metal. The bipolar plate provided by this invention can simplify the manufacturing process of the fuel cell and thus, reduce the production costs. Specially, the dimension and weight of the fuel cell can be decreased such that the actual utilization and mass production of the fuel cell become more convenient and practical.

2. Description of the Related Art

With the rapid growth of human civilization, the consumption of traditional energy sources, such as coal, oil and natural gas, increases rapidly. This has resulted in a serious pollution to the global environment, as well as various environmental problems such as global warming and acid rain. It is now recognized that the natural energy resources are limited. Therefore, if the present rate of consumption continues, all existing natural energy sources will be exhausted in the near future. Accordingly, many developed countries are dedicated to research and development of new and replaceable energy sources. The fuel cell is one of the most important and reasonably priced choices. Compared with traditional internal combustion engines, the fuel cell has many advantages such as high energy transformation efficiency, clean exhaust, low noise, and no consumption of traditional gasoline.

In brief, a fuel cell is an electrical power generation device powered by the electrochemical reaction of hydrogen and oxygen. In basic terms, the reaction is a reverse reaction of the electrolysis of water, to transfer the chemical energy into electrical energy. The basic construction of a fuel cell, for example, a proton exchange membrane fuel cell, comprises a plurality of cell units. The construction of the cell unit can be generally illustrated in FIG. 1. It comprises a proton exchange membrane (PEM) 10 at the middle, with the two sides thereof provided with a layer of catalyst 12, each of the two outsides of the catalyst 12 being further provided with a gas diffusion layer (GDL) 14. An anode plate 16 and a cathode plate 18 are further provided at the outermost sides adjacent to the GDL 14. After tightly combining all the above elements together, a cell unit is formed. For the practical application of a fuel cell, a plurality of the above cell units are stacked and serially connected to provide sufficient power, as illustrated in FIG. 2. Therefore, two adjacent cell units can share a common polar plate 20, as illustrated in FIG. 3, which serves as the anode and the cathode for the two adjacent cell units respectively. Accordingly, such a polar plate 20 is usually referred to as a bipolar plate.

Generally, as illustrated in FIG. 3, the two sides of the bipolar plate 20 are provided with many grooves 22 for transporting the gases for reaction, such as hydrogen and air (to provide oxygen), as well as moving the reactants, such as water droplet or vapor, out of the bipolar plate 20. The conventional bipolar plate 20 is made of pure graphite or a graphite composite. Thus, the grooves on the graphite plate are usually formed by additional mechanical machining with complicated processes and at considerable cost. In addition, if the graphite plate is made by the compression molding of graphite powder, it must be further coated with resin or other material to seal the voids thereof. Moreover, graphite plate has a relatively low extensibility and thus cracks can be formed very easily. The crack on the bipolar plate may introduce leakage of gas and thereby impair the operation efficiency of the fuel cell. Furthermore, due to the requirement of adequate mechanical strength, the thickness of the graphite plate cannot be very thin, so the overall dimension occupied by the fuel cell cannot be further reduced.

BRIEF SUMMARY OF THE INVENTION

It is a primary objective of this invention to overcome the disadvantages of the conventional bipolar plate and to provide a bipolar plate that is thin, light, made by a simplified process, and has a low cost to manufacture. Accordingly, the space occupied by the fuel cell can be reduced and the manufacturing cost of the fuel cell can be lowered, so that the fuel cell is suitable for mass production and commercialization.

The major technical content of this invention is to make a corrugated bipolar plate from a metal sheet and form a plurality of parallel grooves which are complementary to each other on the two side surfaces of the bipolar plate. Because the bipolar plate of this invention is made of metal, the thickness thereof can be relatively thin and, the dimension and weight of the fuel cell can be significantly reduced. In addition, the manufacturing processes of the bipolar plate are simplified and the relative costs can be decreased.

The structures and characteristics of this invention can be realized by referring to the appended drawings and explanations of the preferred embodiments.

DETAILED DESCRIPTION OF THE INVENTION

Figure 1:
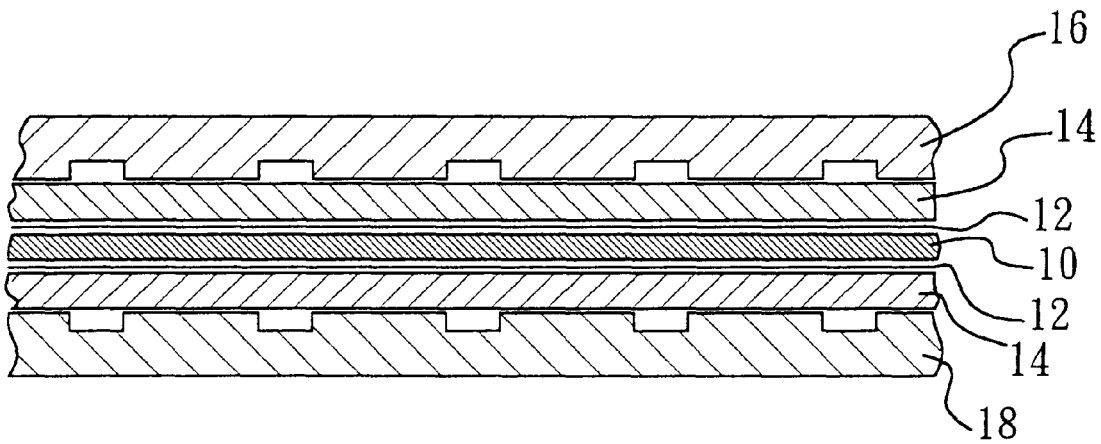
FIG. 1 is a schematic cross sectional view showing the structure of a cell unit of a conventional fuel cell.
Figure 2:
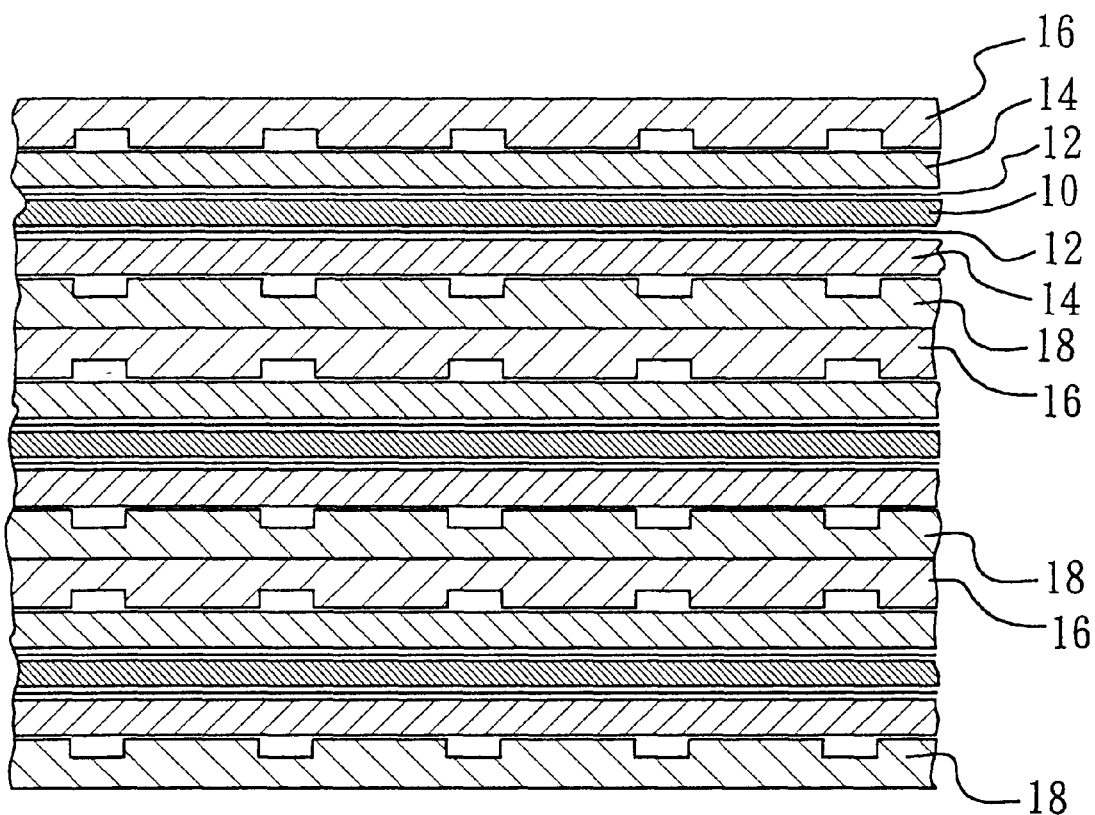
FIG. 2 is a schematic cross sectional view showing the structure of combining a plurality of the conventional cell units.
Figure 3:
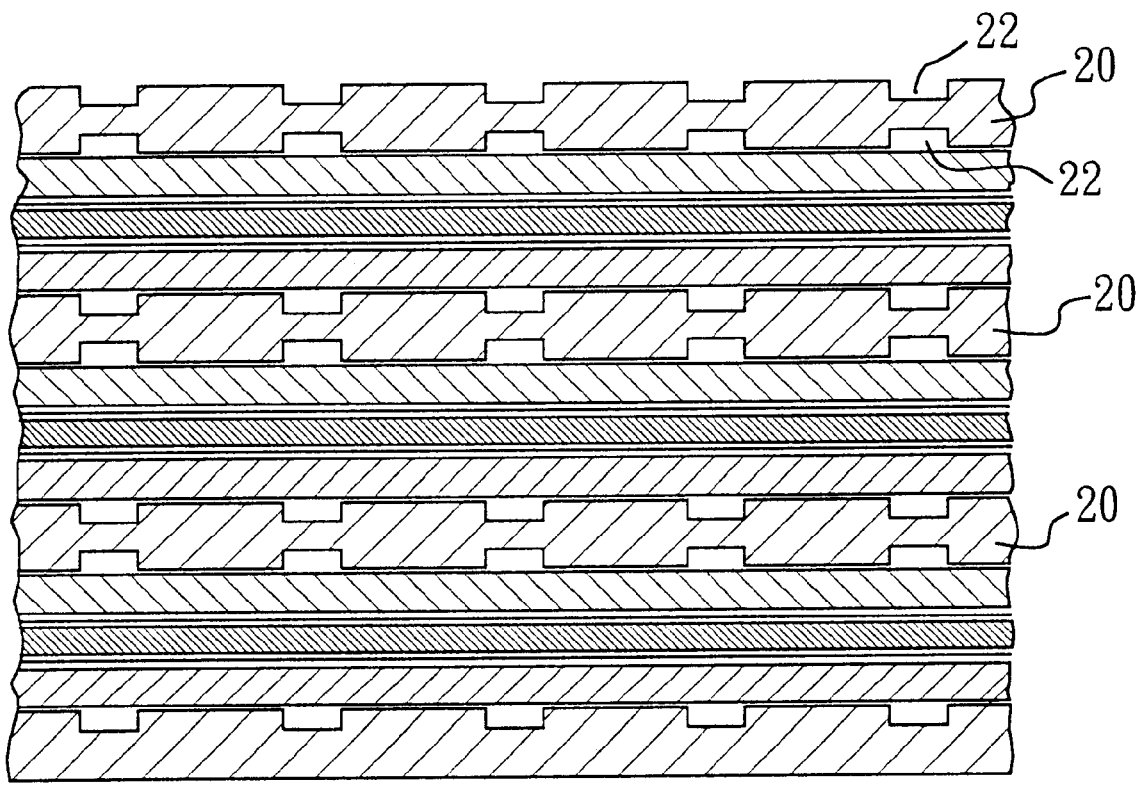
FIG. 3 is a schematic cross sectional view showing a portion of the conventional fuel cell.
Figure 4:
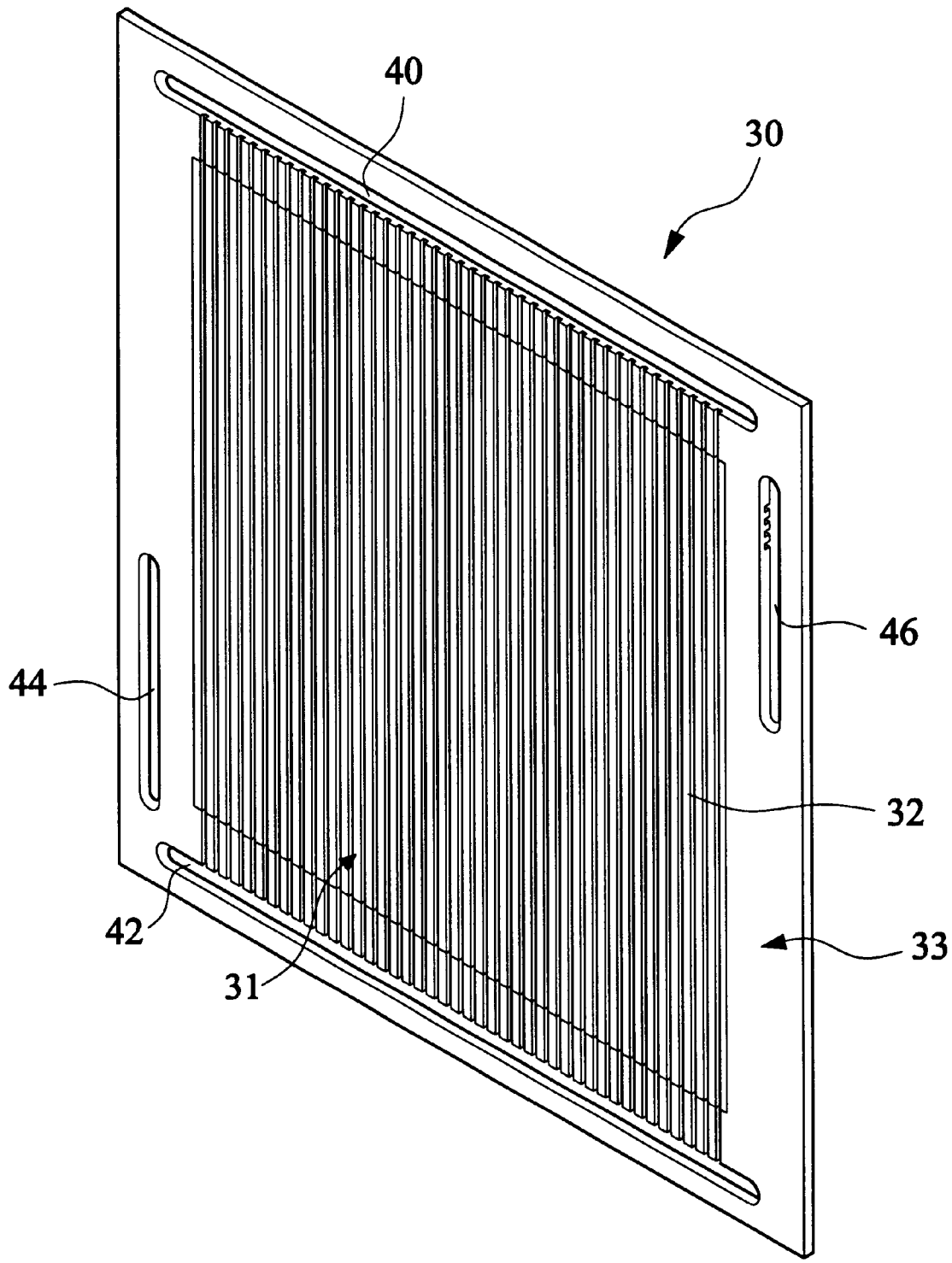
FIG. 4 is a schematic perspective view of a bipolar plate according to a preferred embodiment of this invention.

This invention discloses a bipolar plate 30 for a fuel cell and one of the preferred embodiment is illustrated in FIGS. 4 to 7. The bipolar plate 30 comprises a central area 31 which is made of metal sheet, and a surrounding area 33 which is made of plastic or other appropriate material. In the preferred embodiment of this invention, the metallic central area 31 is first formed by punching, and the surrounding area 33 is formed by the injection of plastic molding. The central area 31 has a first side surface 32, and a second side surface 34 opposite to the first side surface 32. The metal sheet of the central area 31 is in a form of continuous corrugation and the corrugated grooves thereof are parallel with each other. As can be seen in the cross sectional view of FIG. 7, the wave-like continuous corrugation is provided on the first side surface 32 and the second side surface 34 in a complementary manner to form a plurality of extended grooves 36 and 38 thereon respectively so that the cathode gas and the anode gas which need to be definitely separated can be individually directed into the grooves 36 and 38.

Figure 5:
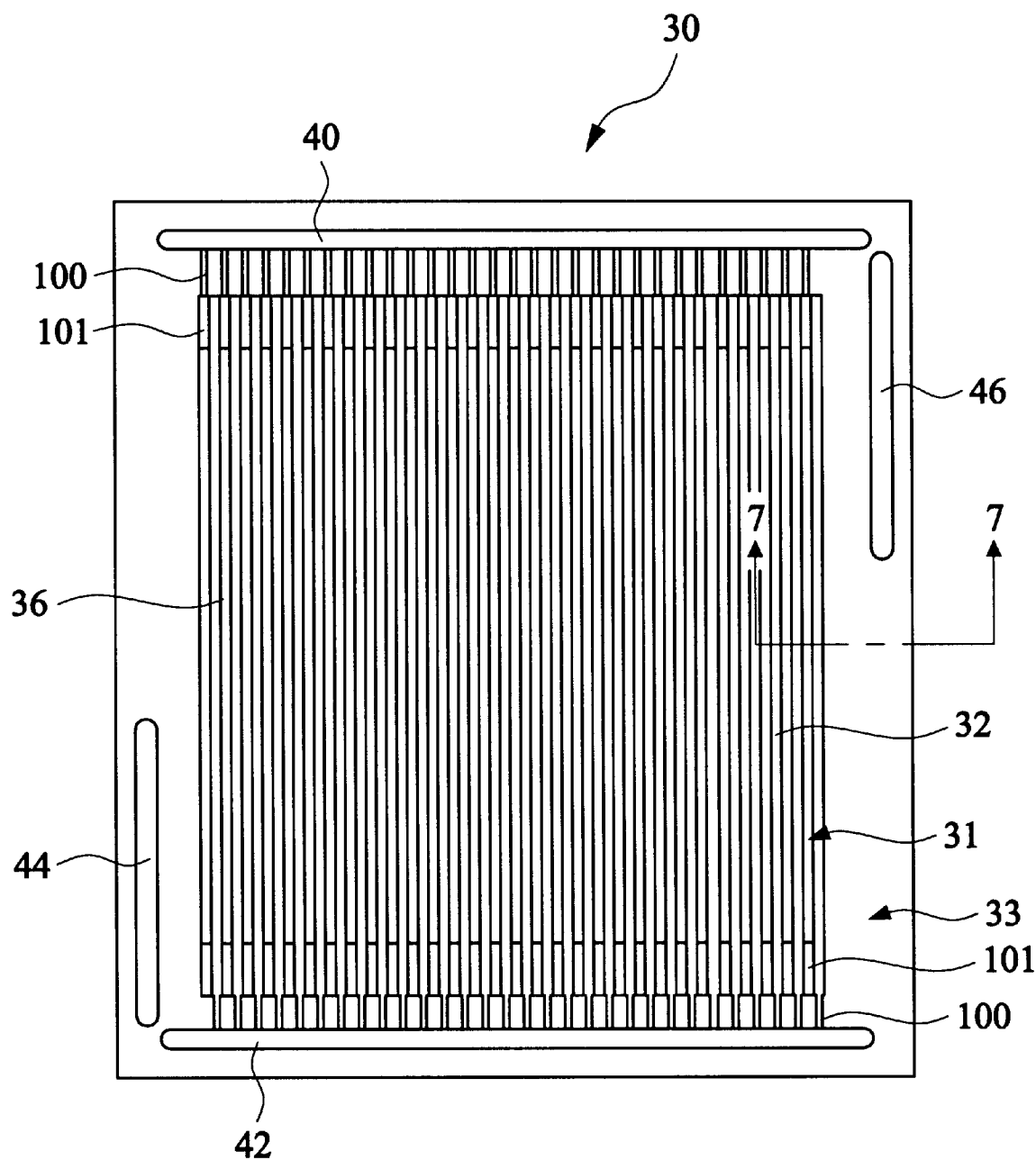
FIG. 5 is a schematic plan view showing a first side surface of the bipolar plate of FIG. 4.
Figure 6:
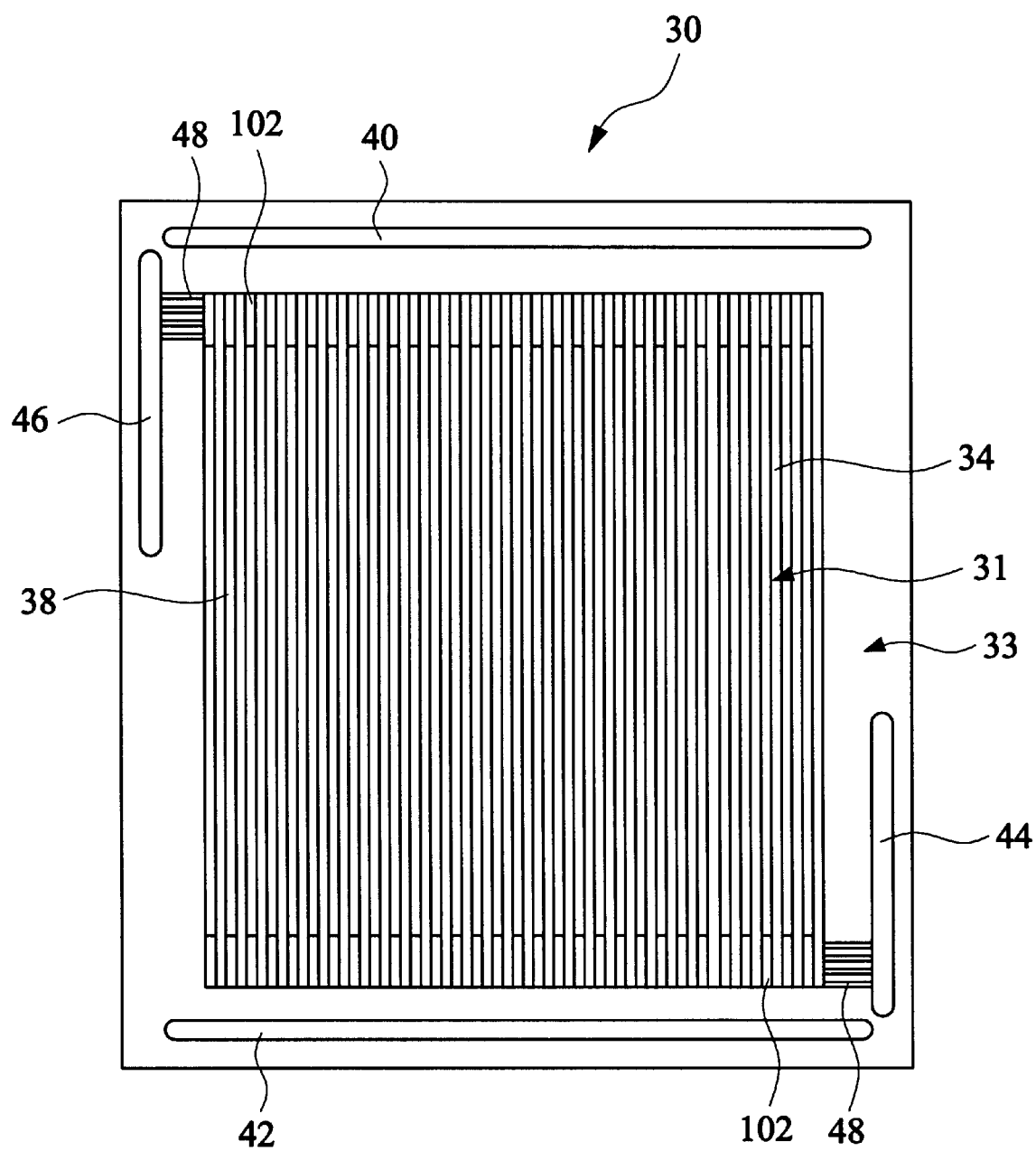
FIG. 6 is a schematic plan view showing a second side surface of the bipolar plate of FIG. 4.
Figure 7:
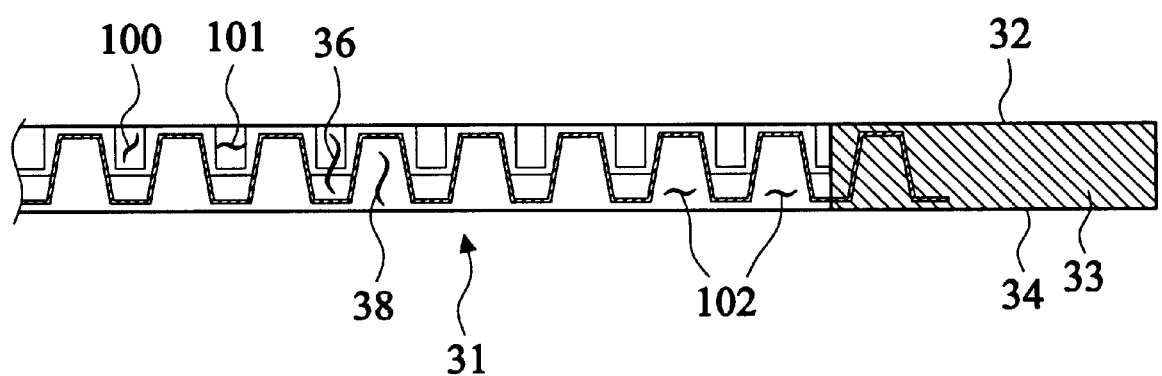
FIG. 7 is a cross sectional view taken along line 7—7 of FIG. 5.

In the preferred embodiment of this invention, the plastic surrounding area 33 of the bipolar plate 30 is further provided with a plurality of elongated holes 40, 42, 44 and 46 near the edge thereof, wherein two of the first holes 40 and 42 are connected with channels 100 extending from two open ends 101 of the parallel grooves 36 on the first side surface 32 for input/output of gas (FIG. 5). Similarly, the second side surface 34 of the bipolar plate 30, as shown in FIG. 6, includes two second holes 44 and 46 as well as channels 48, as can be seen in FIG. 6, which are connected with the two open ends 102 of the parallel grooves 38 on the second side surface 34.

Figure 8:
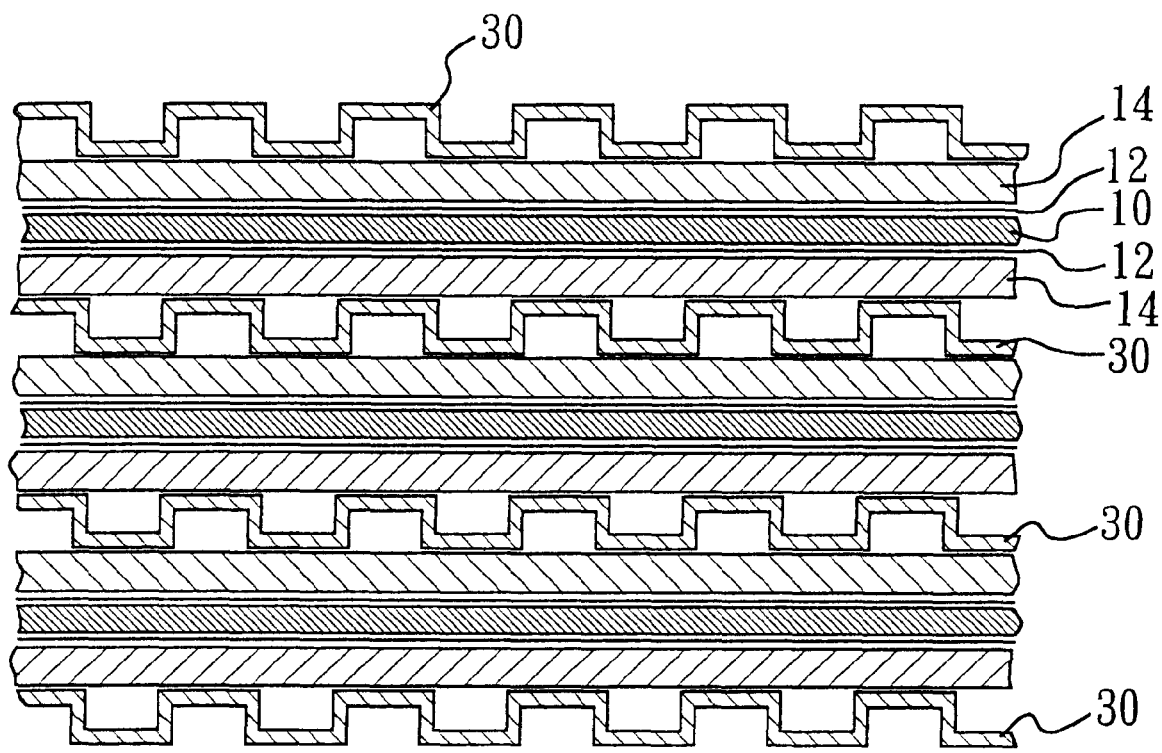
FIG. 8 is a schematic cross sectional view showing a portion of the fuel cell utilizing the bipolar plate according to the preferred embodiment of this invention.

FIG. 8 schematically shows the actual application of this invention in the fuel cell. Because the central area 31 of the bipolar plate 30 of this invention is made of metal, it can be punched directly to form the corrugated shape. Therefore, most of the complicated processes for mechanical machining of the conventional bipolar plate can be eliminated and the manufacturing costs for the fuel cell will decrease correspondingly. Furthermore, metallic material can provide sufficient mechanical strength and thus, the thickness of the bipolar plate can be significantly reduced, for example, to the extent of approximately 0.01 cm. As a result, the amount of material for making the bipolar plate can be reduced, as well as the overall dimensions and weight of the fuel cell.

This invention is related to a unique creation that makes a breakthrough to conventional art. Aforementioned explanations, however, are directed to the description of preferred embodiments according to this invention. Various changes and implementations can be made by those skilled in the art without departing from the technical concept of this invention. Since this invention is not limited to the specific details described in connection with the preferred embodiments, changes to certain features of the preferred embodiments without altering the overall basic function of the invention are contemplated within the scope of the appended claims.

What is claimed is:

1. A bipolar plate for a fuel cell, comprises a central area and a surrounding area, wherein the central area and the surrounding area have corresponding first side surfaces and opposing second side surfaces, the central area being formed by a corrugated plate which defines a plurality of longitudinally directed grooves that are formed on the first side surface and the second side surface thereof, the longitudinally directed grooves being substantially parallel with and complementary to each other, said surrounding area having a pair of first elongated holes respectively formed in opposing longitudinal end portions thereof, each of said longitudinal end portions having a plurality of first channels formed in said first side surface thereof and extending between a corresponding plurality of said longitudinally directed grooves on said first side surface of said central area and a respective one of said pair of first elongated holes to provide fluid communication therebetween, said surrounding area having a pair of second elongated holes respectively formed in opposing lateral side portions thereof, each of said lateral side portions having a plurality of second channels formed in said second side surface thereof and extending in a direction transverse to said longitudinal direction to provide fluid communication between a respective one of said second elongated holes and said longitudinally directed grooves on said second side surface of said central area.

2. The bipolar plate according to claim 1, wherein the corrugated plate is made of a metal sheet.

3. The bipolar plate according to claim 2, wherein the corrugated plate is formed by a punching operation.

4. The bipolar plate according to claim 1, wherein the surrounding area is made of plastic material.

5. The bipolar plate according to claim 1, wherein each of the plurality of second channels is defined by a depression with an open upper end formed in said surrounding area.

6. The bipolar plate according to claim 4, wherein an inner perimeter portion of the surrounding area encompasses an outer perimeter portion of said corrugated plate.

* * * * *